UNITED STATES PATENT OFFICE.

D. R. AVERILL, OF NEWBURG, OHIO.

IMPROVED PAINT-COMPOUND.

Specification forming part of Letters Patent No. 66,773, dated July 16, 1867.

*To all whom it may concern:*

Be it known that I, D. R. AVERILL, of Newburg, in the county of Cuyahoga and State of Ohio, have invented a new and useful Paint-Compound; and I do hereby declare that the following is a full and complete description of the same, of the ingredients used, and of the manner of compounding them.

I first take two hundred pounds of the oxide of zinc in a dry state and grind it in twenty gallons of linseed-oil, to which I add a compound prepared as follows, viz: Mix five pounds of the acetate of lead with ten pounds of the sulphate of zinc in a sufficient amount of water to give a specific gravity of 3° Baumé, when the salts are dissolved. I then take a sufficient quantity of the soluble silicate of soda, dissolved in water, to make three gallons having a specific gravity of 8° Baumé. I also prepare six gallons of a saturated solution of lime-water. I now take three gallons of the mixture of the acetate of lead and zinc solution with three gallons of the solution of the silicate of soda, and add six gallons of lime-water and six gallons of linseed-oil. These are all combined, and then compounded with the aforementioned two hundred pounds of ground zinc and oil, after which are added six gallons of benzine, and the whole compound is then thoroughly ground together, producing a white, glossy, cheap, and durable paint, which may receive any color or tint desired by adding coloring matter to it.

The coloring pigment may be used in place of the aforementioned zinc when positive colors are desired. The light colors or tints may also be obtained by mixing the pigments in proper proportions with the compound when first prepared.

What I claim as my improvement, and desire to secure by Letters Patent, is—

A paint composed of the ingredients herein named, and prepared and compounded substantially in the manner specified.

D. R. AVERILL.

Witnesses:
W. H. BURRIDGE,
J. BROWNING.